(12) United States Patent
Jia et al.

(10) Patent No.: US 8,660,700 B2
(45) Date of Patent: Feb. 25, 2014

(54) VIDEO-BASED SYSTEM AND METHOD OF ELEVATOR DOOR DETECTION

(75) Inventors: Zhen Jia, Shanghai (CN); Pel-Yuan Peng, Shanghai (CN); Enwel Zhang, Beijing (CN); Feng Chen, Beijing (CN); Zisheng Cao, Beijing (CN)

(73) Assignee: Otis Elevator Company, Farmington, CT (US)

( * ) Notice: Subject to any disclaimer, the term of this patent is extended or adjusted under 35 U.S.C. 154(b) by 388 days.

(21) Appl. No.: 12/737,136

(22) PCT Filed: May 22, 2008

(86) PCT No.: PCT/CN2008/000987
§ 371 (c)(1),
(2), (4) Date: May 5, 2011

(87) PCT Pub. No.: WO2009/140793
PCT Pub. Date: Nov. 26, 2009

(65) Prior Publication Data
US 2011/0202178 A1  Aug. 18, 2011

(51) Int. Cl.
*G06F 19/00* (2011.01)
(52) U.S. Cl.
USPC .............................. 700/275; 187/317
(58) Field of Classification Search
USPC ............... 700/275; 187/316, 317, 391, 392; 348/135, E7.085; 702/158
See application file for complete search history.

(56) References Cited

U.S. PATENT DOCUMENTS 6,339,375 B1  1/2002  Hirata et al.
6,973,998 B2 *  12/2005  Deplazes et al. .............. 187/316
7,140,469 B2 *  11/2006  Deplazes et al. .............. 187/316
7,140,470 B2  11/2006  Azpitarte
7,164,784 B2  1/2007  Beardsley
7,992,687 B2 *  8/2011  Yumura et al. ................ 187/316
8,333,035 B2 *  12/2012  Nabetani et al. .................. 49/26
2003/0168288 A1 *  9/2003  Deplazes et al. .............. 187/317
2006/0037818 A1 *  2/2006  Deplazes et al. .............. 187/392
2009/0236185 A1 *  9/2009  Yumura et al. ................ 187/317

FOREIGN PATENT DOCUMENTS

| CN | 1046720 A | 11/1990 |
| CN | 1057440 A | 1/1992 |
| CN | 1061008 A | 5/1992 |
| CN | 1208716 A | 2/1999 |
| CN | 1701034 A | 11/2005 |
| CN | 101107192 A | 1/2008 |
| JP | 7309565 A | 11/1995 |
| JP | 2000351560 A | 12/2000 |
| JP | 2001151446 A | 6/2001 |
| JP | 2008013298 A | 1/2008 |
| JP | 2008100782 A | 5/2008 |
| WO | 2009140793 A1 | 11/2009 |

OTHER PUBLICATIONS

English Translation of Sep. 18, 2012 Japanese Office Action for related Japanese App. No. 2011-509834.
Official Search Report and Written Opinion of the Patent Cooperation Treaty in foreign counterpart Application No. PCT/CN20008/000987, filed May 22, 2008.
English Translation of Jan. 22, 2013 Japanese Office Action for related Japanese App. No. 200880129417.0.

* cited by examiner

*Primary Examiner* — Charles Kasenge
(74) *Attorney, Agent, or Firm* — Kinney & Lange, P.A.

(57) ABSTRACT

A video-based system detects the position of elevator doors based on video data provided by one or more video detectors. Based on the detected position of the elevator doors, a distance between the elevator doors can be determined. The operation of the elevator doors is controlled based, at least in part, on the detected distance between the elevator doors.

21 Claims, 7 Drawing Sheets

VIDEO-BASED SYSTEM AND METHOD OF ELEVATOR DOOR DETECTION

BACKGROUND

The present invention is related to elevator door detection, and in particular to computer vision methods of detecting elevator door position.

Elevator door control is an important aspect of elevator safety. A variety of sensors and systems have been developed to sense the position of elevator doors, as well as to detect any obstacles that would prevent the elevator doors from closing. Traditionally, infrared sensors or proximity sensors installed within each elevator cab provide feedback to a controller regarding the position of the doors and whether any obstacles had been detected between the doors. However, these systems require the installation of dedicated sensors within the elevator, and incur expenses associated with maintaining the operational state of the sensors.

In addition, buildings are increasingly relying on video surveillance to provide building security, access control, and other functions. As part of these systems, it is becoming increasingly common to include video surveillance in, or in close proximity to, elevator cabs. Therefore, it would be beneficial to develop a system that could make use of the video surveillance devices already employed in these buildings to provide the feedback necessary to safely and efficiently control the operation of elevator doors without the use of dedicated sensors.

SUMMARY

An embodiment of the present invention addresses a method of controlling the operation of elevator doors for an elevator cab. This method includes, among other possible steps: acquiring video data comprised of individual frames; detecting a position of the elevator doors based on the acquired video data; determining a distance between the elevator doors based on the detected position of the elevator doors; and controlling the operation of the elevator doors based, at least in part, on the determined distance between the elevator doors.

Another embodiment of the present invention addresses a system for controlling elevator door operation based on video data. This system includes among other possible things: at least one video detector; a video recognition system; and an elevator controller. The at least one video detector is configured to acquire and transmit video data in the form of a plurality of images. The video recognition system is operably connected to receive the video data from the at least one video detector. The video recognition system is operable to: detect a position of the elevator doors based on the acquired video data; and determine a distance between the doors based on the detected position of the elevator doors for each of the plurality of frames. The elevator controller is: operably connected to receive the distance determined by the video recognition system; and configured to control the operation of the elevator doors based, at least in part, on the determined distance between the elevator doors.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are hereafter briefly described.

DETAILED DESCRIPTION

Efforts have been made throughout the drawings to use the same or similar reference numerals for the same or like components.

The present invention provides elevator door detection based on video input provided by one or more optically sensitive devices, such as video cameras, that successively capture and transmit images in real-time (hereinafter referred to as a video detector(s)"). The video input is analyzed by computer methods to detect the edges of the elevator door or doors. Based on the detection of the door edges, the distance between the door edges can be determined for each frame analyzed. In turn, the detected door distance is used to infer the state of the elevator doors (e.g., doors opened, doors closed, doors opening, doors closing). The detected distance between the door edges, as well as the inferred state of the elevator doors is provided as feedback to the elevator door controller. Based on these inputs, as well as any additional inputs, the elevator door controller generates instructions to safely and efficiently control the operation of the elevator doors.

Figure 1:
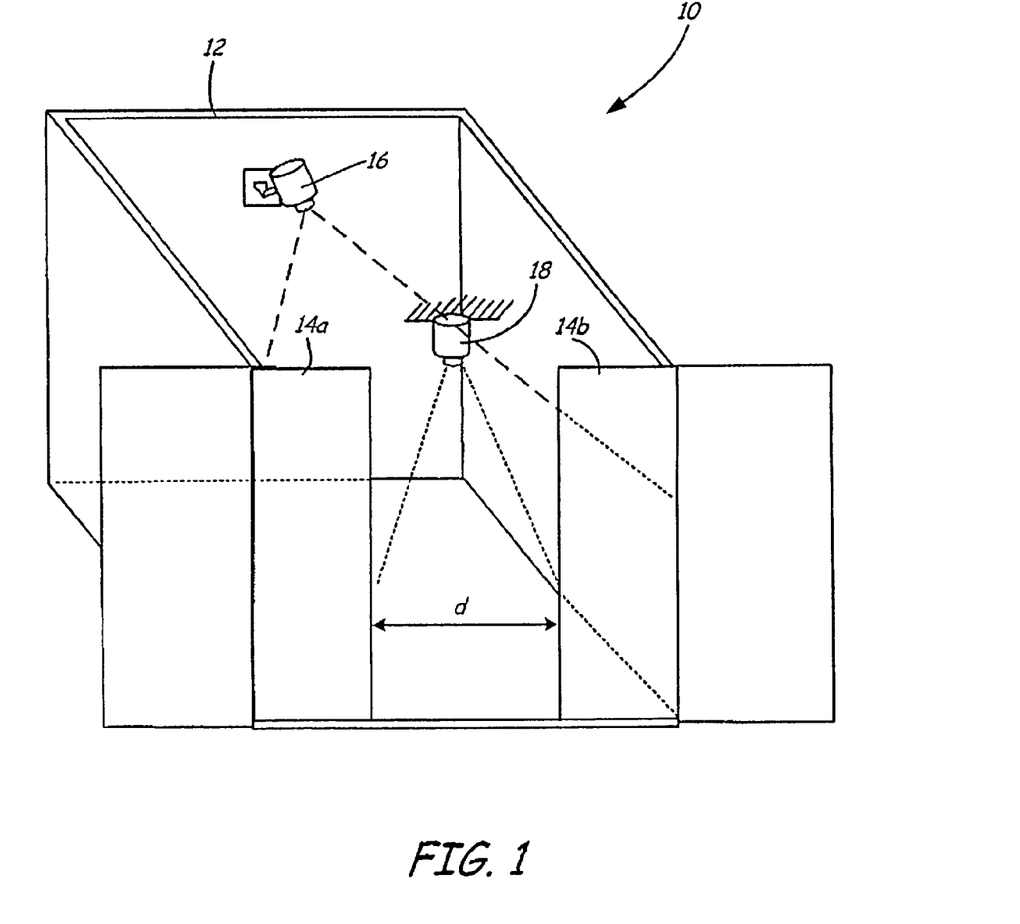
FIG. 1 is a perspective view of an elevator system according to an embodiment of the present invention, including video devices positioned to monitor the operation of the elevator doors.

FIG. 1 is a perspective view of elevator system 10, which includes elevator cab 12, elevator cab doors 14a and 14b, first video detector 16 and second video detector 18. In this embodiment, first video detector 16 is located on a back wall of elevator cab 12 and positioned to monitor the opening and closing of elevator doors 14a and 14b. Second video detector 18 is located on the ceiling of elevator cab 12 and is also positioned, albeit from a slightly different perspective, to monitor the opening and closing of elevator doors 14a and 14b. In many embodiments, first video detector 16 and second video detector 18 are used as alternatives to one another, although they may be used in conjunction with one another to provide more robust results or to account for situations in which one video detector is obscured. Further, either or both of the cab-based video detectors 16, 18, which may be used primarily to detect the location of the cab doors 14a, 14b, may be used in conjunction with one or more similar landing-based video detectors (not shown), which may be used primarily to detect the location of the hoistway doors (not shown) for a particular hoistway entrance at a landing.

In exemplary embodiments, first video detector 16 and second video detector 18 are surveillance type cameras, capable of providing video input that consists of a plurality of successive video frames. A video detector may include a video camera or other video data capture device. The term video input is used generically to refer to video data representing two or three spatial dimensions as well as successive frames defining a time dimension.

Based on the video input provided by video detectors 16 and/or 18, computer vision techniques are applied to the acquired video input in order to detect the position of elevator doors 14a and 14b (described in more detail with respect to FIGS. 3A-5B). Based on the detected elevator door position, the distance d between the respective elevator doors can be determined, or between a respective elevator door and a side of the elevator door in single-door applications. By analyzing successive frames of the provided video input, the change in the distance d over time ($\Delta d/\Delta t$) between elevator doors 14a and 14b can be used to infer the state of the elevator doors. For purposes of this description, there are four relevant states associated with elevator door control, including: 'door closed', 'door opening', 'door opened', and 'door closing.' Thus, a decrease in the detected distance d over successive frames indicates that elevator doors 14a and 14b are in the process of closing. Likewise, an increase in the detected distance d over successive frames indicates that elevator doors 14a and 14b are in the process of opening. In addition to employing video data to determine the distance d between the elevator doors 14a, 14b and the state of the elevator doors, the video input may also be analyzed to determine the presence of people approaching or exiting the elevator cab (described in more detail with respect to FIGS. 6A and 6B). In this way, the video input is used to provide feedback regarding the status of the elevator doors. As described with respect to FIG. 2, this feedback is used to safely and efficiently control the operation of elevator doors 14a and 14b.

Figure 2:
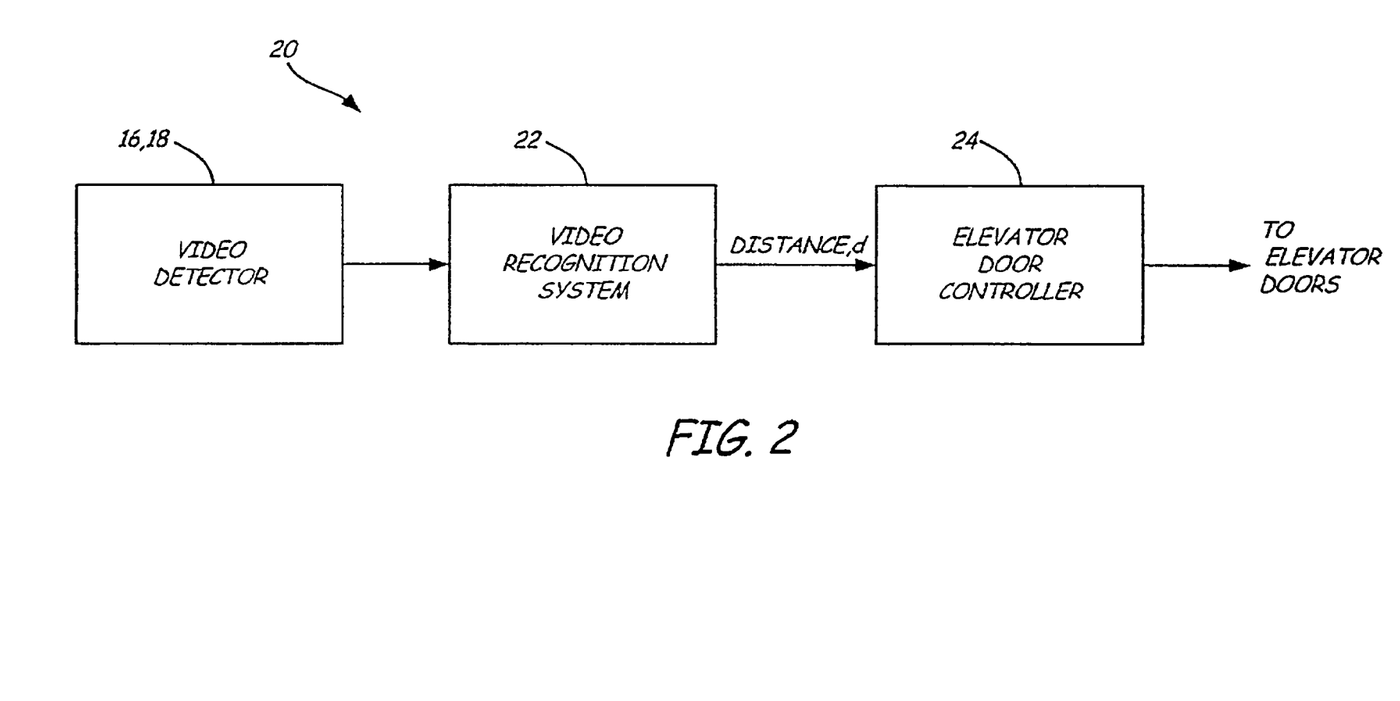
FIG. 2 is a block diagram of components employed by the elevator system of the embodiment shown in FIG. 1, the components being used to acquire video data, process the video data, and provide the desired feedback to a door controller.

FIG. 2 is a functional block diagram of elevator control system 20, which includes video detectors 16 and 18, video recognition system 22 and elevator door controller 24. Video input captured by first video detector 16 and/or second video detector 18 are provided for analysis to video recognition system 22.

Video recognition system 22 includes a combination of hardware and software necessary to analyze the video data provided by the video detectors. The provision of video by one or more of the video detectors 16, 18 may be by any of a number of means, such as a hardwired connection, over a dedicated wireless network, over a shared wireless network, etc. Hardware included within video recognition system 22 includes, but is not limited to, a microprocessor (not shown) as well as memory (not shown). Software included within video recognition system 22 may include video content analysis software, which is described in more detail with respect to the functions shown in FIGS. 3A and 6A.

In particular, video recognition system 22 analyzes the video input provided by video detectors 16 and/or 18 and generates outputs that are provided as feedback to elevator controller 24. In an exemplary embodiment, video recognition system 22 analyzes the video input to detect edges associated with elevator doors 14a and 14b (as shown in FIG. 1).

In one exemplary embodiment a line-based method (described in detail with respect to FIGS. 3A and 3B) is employed by video recognition system 22 to detect lines representing the edges of elevator doors 14a and 14b. Based on the detected edges of elevator doors 14a and 14b, the distance d between the doors as well as the state of the elevator doors can be determined as previously discussed. In another exemplary embodiment, which may be used either alone or in conjunction with the line-based method, a mark-based method (described in detail with respect to FIGS. 4-5B) may be employed by video recognition system 22 to detect distinctive marks placed near the edges of each elevator door. Based on the detected marks, the distance d between the doors 14a, 14b as well as the state of the elevator doors can be determined as previously discussed.

In another exemplary embodiment, in addition to detecting the edges of elevator doors 14a and 14b, video recognition system 22 analyzes the video input provided by video detectors 16 and/or 18 to detect the presence of people approaching or exiting elevator cab 12. In an exemplary embodiment (described in more detail with respect to FIGS. 6A and 6B), video recognition system 22 employs a difference operation and timestamps to detect both the presence and direction of people in and around elevator cab 12.

Outputs generated by video recognition system 22, including the detected distance d between the elevator doors and/or the detected presence of people either approaching or exiting elevator cab 12, are provided as feedback to elevator door controller 24. Elevator door controller 24 includes a combination of hardware and software for determining the state of the elevator doors 14a, 14b and for generating control instructions for controlling the operation of the elevator doors based on the feedback received from video recognition system 22. Once again, the provision by which video recognition system 22 provides door controller 24 with feedback may be by any of a number of means, including by a hardwired connection, over a dedicated wireless network, over a shared wireless, network, etc. Door controller 24 may also be represented more simply as decisional logic that provides an output (in this case, elevator door controls) based on the feedback provided by video recognition system 22.

Door controller 24 generates instructions to control aspects such as the length of time elevator doors 14a and 14b are maintained in an opened or closed state, the speed with which the elevator doors 14a and 14b are opened or closed. These operations are based, in part, on the feedback received from video recognition system 22. For instance, when closing elevator doors it is typically desirable to close the doors with relative quickness initially, and then to decrease the speed of the elevator doors as the doors approach the fully closed state. In this way the overall time required to close the elevator doors is minimized. Thus, if the feedback provided by video recognition system 22 initially indicates that the distance d between elevator doors 14a and 14b is large (i.e., the doors are opened), then door controller 24 will generate control instructions that cause elevator doors 14a and 14b to close relatively quickly. As the feedback provided by video recognition system 22 indicates that the distance d between elevator doors 14a and 14b has decreased, door controller 24 generates instructions to decrease the speed of the elevator doors until the feedback indicates the doors are in the closed state. In this way, the amount of time it takes to close elevator doors 14a and 14b is decreased.

In another example, feedback received from video recognition system 22 indicating the presence of people approaching or exiting elevator cab 12 is employed by door controller 24 to control the operation of elevator doors 14a and 14b. For instance, in response to video recognition system 22 detecting the presence of one or more people approaching elevator cab 12, door controller 24 may maintain elevator doors 14a and 14b in a door opened state for an extended period of time to allow the detected person to enter elevator cab 12. In addition, elevator controller 24 may change the state of elevator doors 14a and 14b in response to a detected person either approaching or exiting elevator cab 12. For instance, in response to video recognition system 22 detecting the presence of a person approaching elevator cab 12, door controller may change the state of elevator doors 14a and 14b from a door closing state to a door opening state to allow the person time to enter elevator cab 12. In other embodiments, similar operations are performed in response to feedback indicating that a person is exiting elevator cab 12, or in response to the detection of an obstacle located between elevator doors 14a and 14b.

Figure 3A:
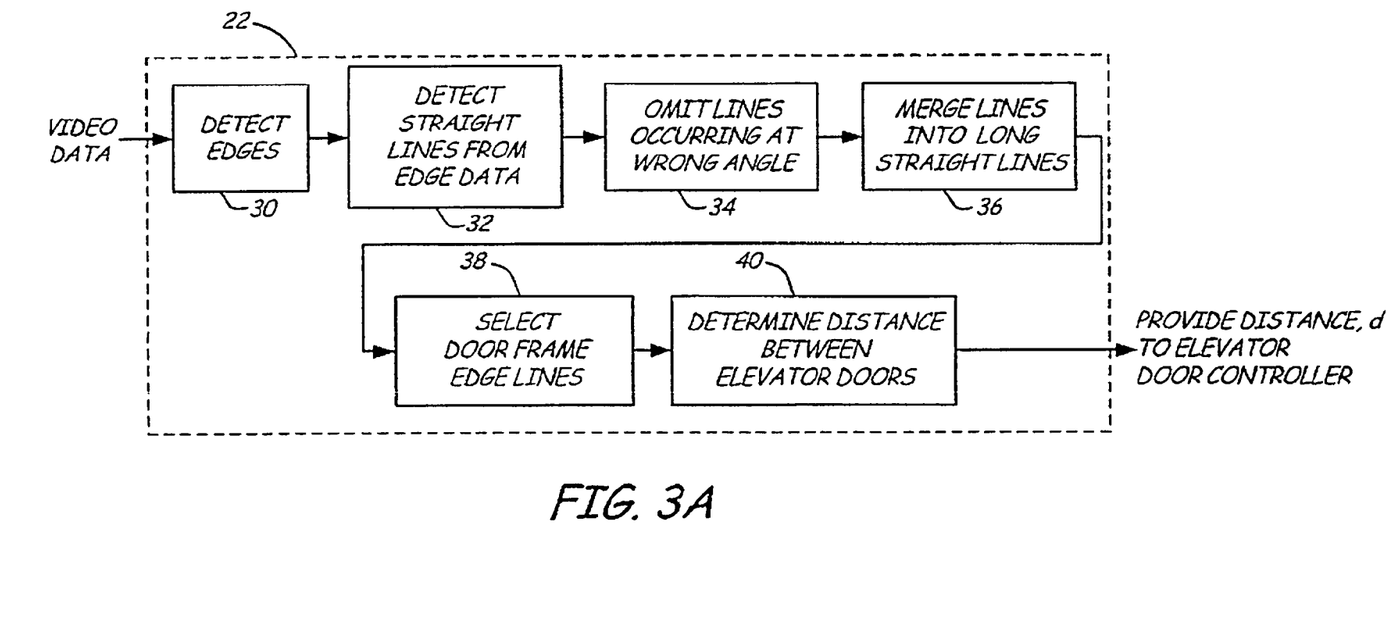
FIG. 3A is a block diagram illustrating an exemplary embodiment of the functions performed by a video recognition system to detect the position of the elevator doors.
Figure 3B:
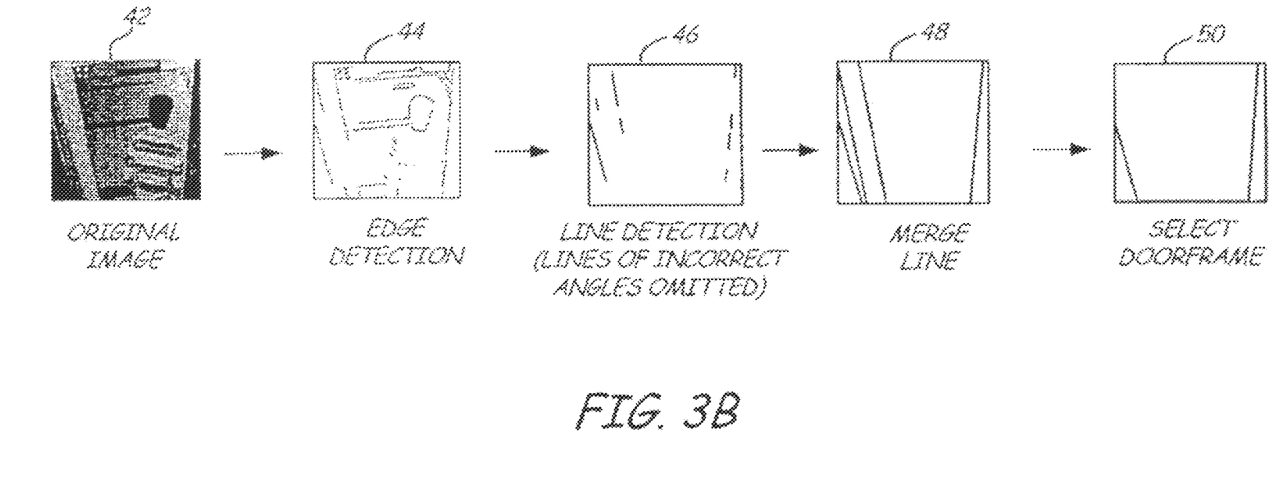
FIG. 3B is a sample frame of video data that illustrates elevator door detection using the functions described with respect to FIG. 3A.

FIG. 3A illustrates an exemplary embodiment of the functions or calculations performed by video recognition system 22. FIG. 3B is provided to illustrate graphically the result of the functions performed in FIG. 3A. However, it should be noted that the sample images shown in FIG. 3B are for illustrative purposes, and do not reflect the actual outputs generated by video recognition system 22.

As shown in FIG. 3A, video recognition system 22 performs the following functions with respect to video images provided by video detectors 16 and/or 18, including: detecting edges within each image, detecting straight lines based on the image data; omitting lines determined to occur at the wrong angle, merging of remaining lines into a straight line, selectively determining which of the remaining lines represent the doorframe edges, and determining the actual distance d between the doorframe edges.

Thus, video recognition system 22 receives video input from one or more video detectors 16, 18. It is assumed for the purposes of this description that the video input provided to video recognition system 22 is in digital format, although in embodiments in which the video input generated by the one or more video detectors is analog, then an additional analog-to-digital converter will be required to format the images such that a computer system can operate on them. This conversion may be performed within the video detectors themselves, or may be performed by video recognition system 22 as a first step (not shown).

In addition, the video input operated on by video recognition system 22 consists of a number of individual frames. In an exemplary embodiment, the frames are stored to a buffer (not shown). The functions performed by video recognition system 22 may then be applied to each frame stored to the buffer in succession, or may be applied to frames separated by some predetermined number of intermediate frames that are not analyzed by video recognition system 22.

At step 30, video recognition system 22 begins the analysis by detecting edges within the image frame being analyzed. In an exemplary embodiment, the well-known Canny edge detection operator is employed to detect edges within the image. Depending on the processing capability of video recognition system 22, as well as the response time required, different variations of the Canny operator may employed. In particular, the filter employed to reduce noise and the thresholds used to detect a particular edge can be selected to provide the desired response.

For example, edge detection performed on image 42 (as shown in FIG. 3B) results in video recognition system 22 detecting the edges shown in image 44. As shown in image 44, edge detection results in the detection of both straight and curved edges.

Based on the knowledge that the edge of the elevator doors will always be a straight line, at step 32, video recognition system 22 isolates straight lines within the edges detected at step 30. In an exemplary embodiment, the well-known Hough transformation is employed to differentiate between straight lines and curved lines. The Hough transformation analyzes collections of points identified as edges in the previous step, and in particular, employs a voting process to determine if the collection of points constitutes a straight line. In addition, at step 34 knowledge of the position of the elevator doors relative to the video detector is employed to omit straight lines occurring at angles outside of an expected range. For example, based on the position of video detection camera 16 (as shown in FIG. 1) straight lines occurring at horizontal angles would be omitted.

For example, line detection and the omission of non-vertical lines performed on image 44 (as shown in FIG. 3B) results in video recognition system 22 detecting the straight lines shown in image 46 (as indicated by the bolding of identified straight lines). This image illustrates the effects of both line recognition, and the omission of lines occurring outside of a defined range, such that the remaining lines are good candidates for defining the edges of the elevator doors. The remaining straight lines may be, e.g., the detected corners of the cab 12 and/or edges of the walls of the cab 12.

At step 36, the straight, vertical (or near vertical) lines identified at steps 32 and 34 are merged to create long straight lines. That is, discontinuous lines located along the same plane will be merged into a long, single line. In an exemplary embodiment, a dynamic cluster method is used to merge discontinuous lines into a single line.

For example, merging of discontinuous lines performed on image 46 (as shown in FIG. 3B) results in video recognition system 22 generating the long straight lines shown in image 48 (once again, indicated by the bolding of the long straight lines). In this example, several long straight lines have been identified, and therefore there are several candidates to choose from with respect to which of the lines represents the edges of the elevator doors.

At step 38, video recognition system 22 selects from the long straight lines generated at step 36 to represent the edge of the elevator doors. In an exemplary embodiment, the leftmost and rightmost long straight lines are selected as representing the edges of the elevator doors. In other embodiments, additional input may be incorporated in detecting the location of the door edges, including the current state of the doors (e.g., doors opened, doors closed, doors opening, doors closing, etc.) and previously detected locations of the doors (e.g., the location of detected edges in previous frames).

For example, image 50 (shown in FIG. 3B) illustrates the result of video recognition system 22 selecting the leftmost and rightmost lines to represent the edges of the elevator doors.

Based on the selection of lines representing the position of the doors, at step 40 the distance between the lines can be used to generate an estimate of the distance d between the respective edges of the elevator doors 14a, 14b. In an exemplary embodiment, the pixels separating the lines representing the elevator doors are counted, and the results are used to generate a pixel distance between the respective doors. Based on known information regarding the location of the camera, the distance between the camera and the elevator doors, and the pixel distance an estimate is generated regarding the actual distance d between the elevator doors.

In an exemplary embodiment, a number of individual components are employed by video recognition system 22 to implement the functions described with respect to FIG. 3A.

For instance, step 30 is performed by an edge detector, such as a Canny edge detector operator. Step 32 is performed by a straight line detector that differentiates between straight and non-straight lines. In an exemplary embodiment, the straight line detector employs the Hough transformation to make the determination. Step 34 is performed by a line selector that selects lines occurring at angles within an expected range (or, conversely, can omit lines occurring at angles outside of an expected range). Step 36 is performed by a line merger that combines the lines selected by the line selector into long straight lines. In an exemplary embodiment, the line merger employs dynamic clustering to merge discontinuous lines into long straight lines. Step 38 is performed by door edge detector that determines, based on the long straight lines generated by the line merger, the lines representing the edges of elevator doors 14a, 14b. Step 40 is performed by a distance calculator that determines based on the door edges detected by the door edge detector, the distance between elevator doors 14a, 14b. In an exemplary embodiment, the distance calculator generates the distance estimate based on the location of the camera, the distance between the camera and the elevator doors, and the number of pixels located between the edges of elevator doors 14a, 14b.

Each of these components described as part of video recognition system 22 may be embodied in the form of computer or controller implemented processes and apparatuses for practicing those processes. For instance, a computer comprised of a processor and storage device (e.g., hard disk, random access memory, etc.) are operable to implement a software application that implements the components described above. The present invention can also be embodied in the form of computer program code containing instructions embodied in a computer readable medium, such as floppy diskettes, CD-ROMs, hard drives, or any other computer-readable storage medium, wherein, when the computer program code is loaded into and executed by a processor employed in video recognition system 22, the video recognition system becomes an apparatus for practicing the invention. The present invention may also be embodied in the form of computer program code as a data signal, for example, whether stored in a storage medium, loaded into and/or executed by a computer or video recognition system 22, or transmitted over some transmission medium, such as over electrical wiring or cabling, through fiber optics, or via electromagnetic radiation, wherein, when the computer program code is loaded into and executed by a computer or video recognition system 22, the computer or video recognition system 22 becomes an apparatus for practicing the invention. When implemented on a general-purpose microprocessor, the computer program code segments configure the microprocessor to create specific logic circuits corresponding to the components described above.

For example, memory included within video recognition system 22 may store program code or instructions for implementing the functions shown in FIG. 3A. The computer program code may be communicated to a processor included within video recognition system 22, which may execute the program code to implement the functionality described with respect to the present invention.

Figure 4:
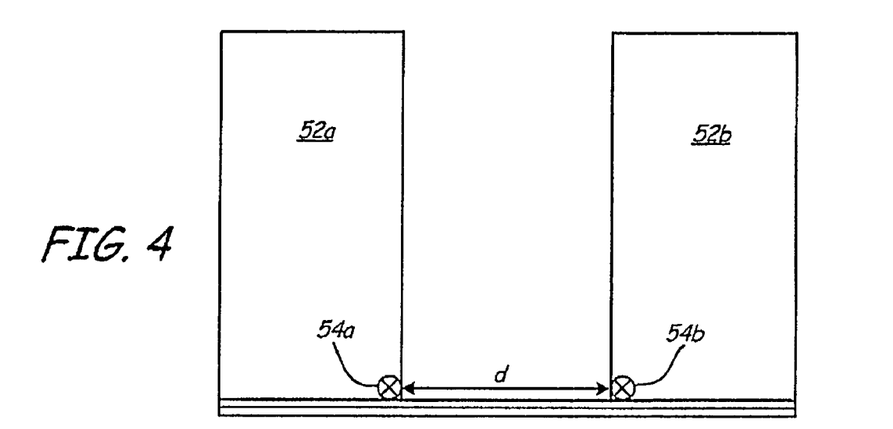
FIG. 4 is a side view of an elevator door that includes distinctive markings employed to simplify edge detection of the elevator doors.

FIG. 4 is a side view of elevator doors that may be used in conjunction with the elevator system of the present invention. In particular, FIG. 4 illustrates the inclusion of markers 54a and 54b along the edge of elevator doors 52a and 52b. Markers 54a and 54b are designed to be easily discernable by video recognition system 22. That is, the use of highly discernible marks decreases the computational complexity and cost associated with door edge detection.

Figure 5A:
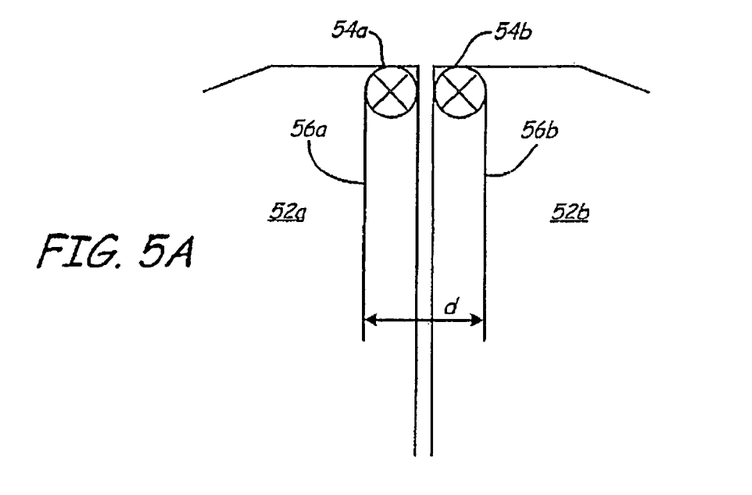
FIGS. 5A and 5B are sample frames of video data that illustrate elevator door detection using the distinctive markings shown in FIG. 4.
Figure 5B:
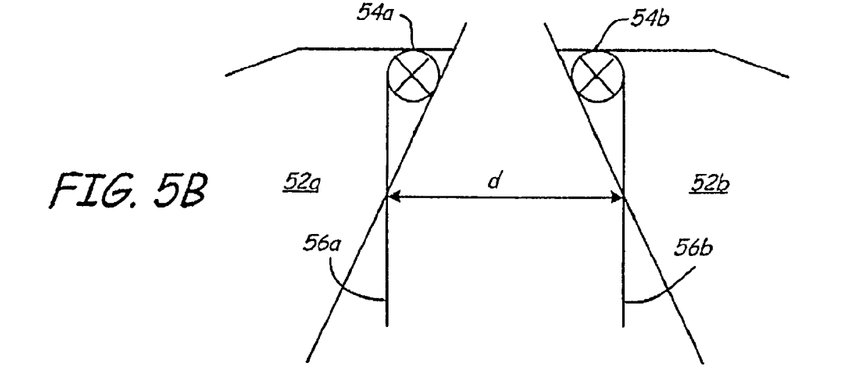

FIGS. 5A and 5B are perspective views (from the perspective of video detector 18 shown in FIG. 1) illustrating how physical marks 54a and 54b are used to discern the position of elevator doors 52a and 52b. After discerning the location of marks 54a and 546, video recognition software determines, as indicated by lines 56a and 56b, the position of elevator doors 52a and 52b. The determination of the lines 56a, 56b, may be, for example, based on example-based analysis, color-based analysis, geometrical analysis, or a combination thereof. Based on this determination, the distance between the elevator doors 52a and 52b can be determined as discussed above with respect to FIGS. 3A and 3B. For instance, the number of pixels located between lines 56a and 56b can be counted, and the result, when taken into account along with the known position of the video detectors 16, 18 and the known distance between the video detectors 16, 18 and the doors 14a, 14b, can be converted to an estimate of distance.

Although the use of physical markers as described with respect to FIGS. 4, 5A and 5B may be used independently, in an exemplary embodiment video recognition system 22 discerns elevator door edges based on a combination of both the line-based method (described with respect to FIGS. 3A and 313) and the marker-based method. In this way, in the event that the edges cannot be discerned based on one method (for example, if the physical markers are covered up or otherwise unavailable to the video detector) then the other method may be employed to discern the position of the elevator doors.

Figure 6A:
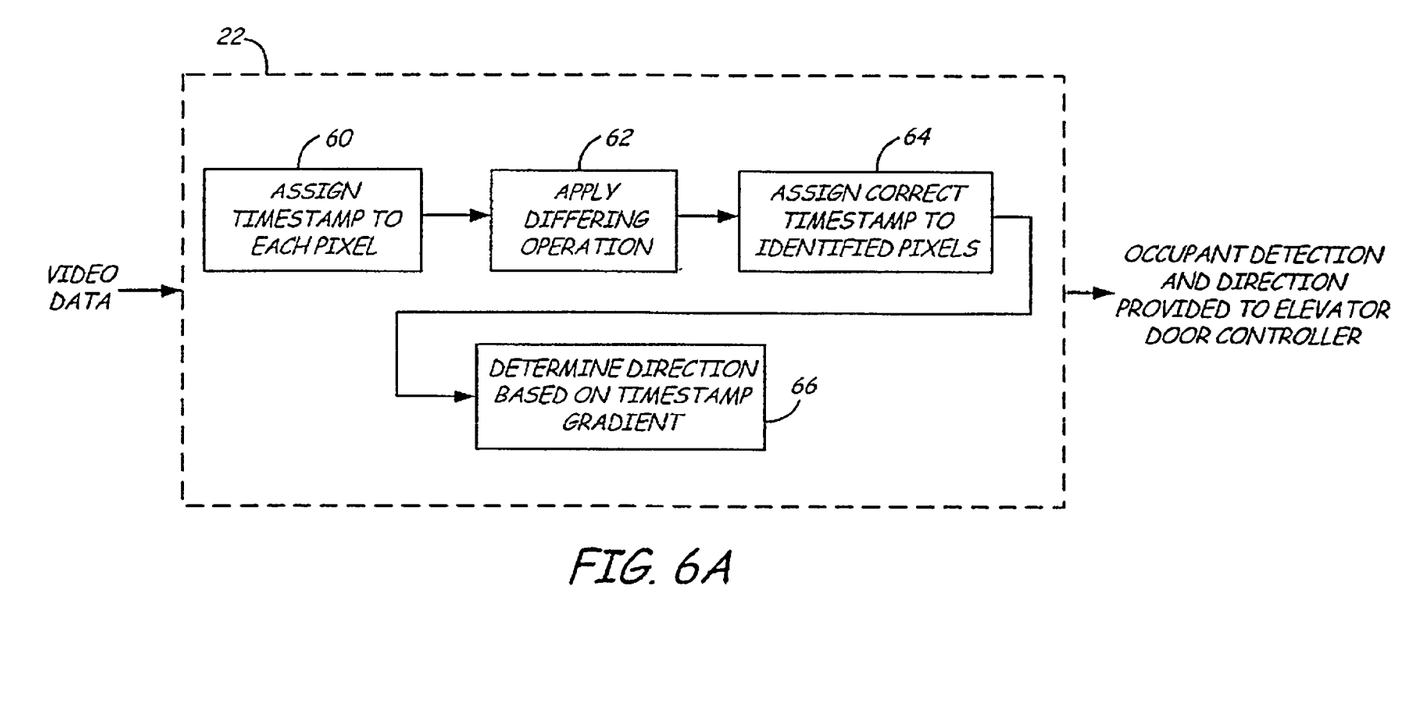
FIG. 6A is a block diagram illustrating an exemplary embodiment of the functions performed by the video recognition system to detect the presence of people approaching or exiting the elevator cab.

FIG. 6A is a block diagram illustrating an exemplary embodiment of functions performed by video recognition system 22 in detecting the presence of a person approaching or exiting elevator cab 12 (as shown in FIG. 1). The result of the functions performed in FIG. 6A are illustrated with respect to a sample image shown in FIG. 6B. The functions described with respect to FIGS. 6A and 6B would be in addition to the functions performed to detect the edges of elevator doors 14a and 14b.

Once again, video input is provided by one or more video detectors. At step 60, video recognition system 22 assigns a timestamp to each pixel in the current frame of data. At step 62, a difference operation is performed on successive frames of video data provided by the video detectors. The differencing operation compares pixels from successive frames and detects differences between one or more of the pixels. At step 64, pixels identified as varying from one frame to the next are assigned a new timestamp (i.e., a more recent timestamp). At step 66, the gradient associated with the timestamps assigned to various pixels is used to determine a direction associated with a particular person. In particular, the direction the person is traveling is determined as pointing in the direction of the most recently assigned timestamps. That is, the method assumes that a person moving through the field of view of a video detector is detectable based on the changing status of pixels over time. The difference operation detects the presence of changing pixels (indicative of a detected person) and the gradient associated with the timestamps assigns a direction to the detected person. In this way, video recognition system 22 is able to provide feedback to door controller 24 regarding the presence and direction of people located proximate to elevator cab 12.

Figure 6B:
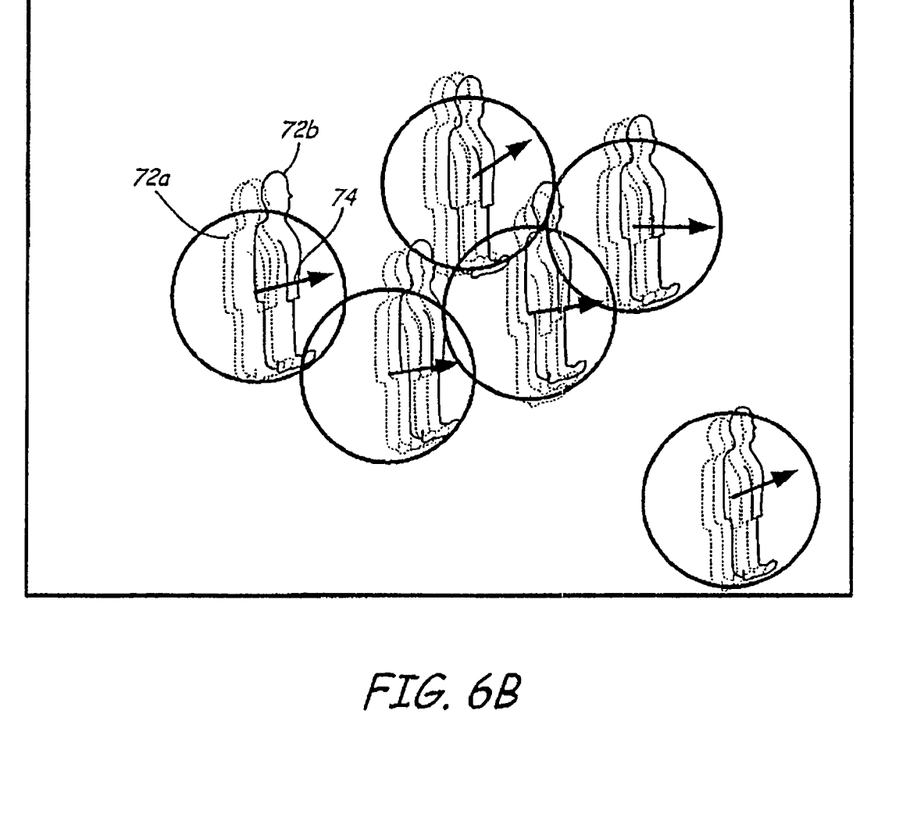
FIG. 6B is a sample frame of video data that illustrates people detection using the functions described with respect to FIG. 6A.

As shown in FIG. 6B, timestamps corresponding to a first timestamp have been assigned to pixels identified by dashed lines 72a, and timestamps corresponding to a second timestamp have been assigned to pixels identified by lines 72b. Based on the gradient of the assigned timestamps (i.e., flowing from earlier in time to later in time), the direction of the detected person is determined as shown by arrow 74.

Embodiments of the present invention make use of video data to provide feedback regarding the operation of the elevator doors. Analysis of the video data allows for determinations to be made regarding the distance between the elevator doors and the state of the elevator doors. In addition, analysis of the video data can be used to detect the presence of people approaching or exiting the elevator cab, as well as the presence of obstacles between the doors. In this way, the present invention is an improvement over prior art systems that required dedicated sensors to detect the state of the elevator doors.

The aforementioned discussion is intended to be merely illustrative of the present invention and should not be construed as limiting the appended claims to any particular embodiment or group of embodiments. Thus, while the present invention has been described in particular detail with reference to specific exemplary embodiments thereof, it should also be appreciated that numerous modifications and changes may be made thereto without departing from the broader and intended scope of the invention as set forth in the claims that follow.

The specification and drawings are accordingly to be regarded in an illustrative manner and are not intended to limit the scope of the appended claims. In light of the foregoing disclosure of the present invention, one versed in the art would appreciate that there may be other embodiments and modifications within the scope of the present invention. Accordingly, all modifications attainable by one versed in the art from the present disclosure within the scope of the present invention are to be included as further embodiments of the present invention. The scope of the present invention is to be defined as set forth in the following claims.

The invention claimed is:

1. A method of controlling the operation of elevator doors for an elevator cab, the method comprising:
    acquiring video data comprised of individual frames;
    detecting a position of doorframe edges of the elevator doors based on the acquired video data;
    determining a distance between the elevator doors based on a number of pixels located between the detected position of the doorframe edges of the elevator doors; and
    controlling the operation of the elevator doors based, at least in part, on the determined distance between the elevator doors.

2. The method of claim 1, wherein detecting the position of the elevator doors based on the acquired video data includes:
    applying a line-based method, a mark-based method, or a combination thereof to detect the position of the elevator doors.

3. The method of claim 2, wherein detecting the position of the elevator doors based on the line-based method further includes:
    detecting edges within each frame of acquired video data; and
    detecting straight lines based on the detected edges.

4. The method of claim 3, wherein detecting the position of the elevator doors based on the line-based method further includes:
    omitting detected straight lines occurring at angles outside an expected range of angles; and
    merging the remaining straight lines occurring within the expected range of angles into merged lines.

5. The method of claim 4, wherein detecting the position of the elevator doors based on the line-based method further includes:
    determining, based on the location of the merged lines, a left-most and right-most edge of the elevator doors that define the position of the elevator doors.

6. The method of claim 2, wherein detecting the position of the elevator doors based on the mark-based method further includes:
    detecting a mark positioned on each of the elevator doors; and
    determining based on the detected mark the position of the elevator doors.

7. The method of claim 1, further comprising:
    determining a current state associated with the elevator doors based on the determined distance between the elevator doors in successive frames of the video data; and
    controlling the operation of the elevator doors based, in addition, on the determined state of the elevator doors.

8. The method of claim 1, further comprising:
    detecting the presence of a person approaching or exiting the elevator cab based on detected locations of the person in successive frames of the video data.

9. The method of claim 8, wherein detecting the presence of a person approaching or exiting the elevator cab based on detected locations of the person in successive image frames of the video data includes:
    assigning a first timestamp to each pixel within a first frame of video data;
    detecting differences in pixels in a second or subsequent frame of video data;
    assigning a second timestamp to pixels indicating differences between the first frame of video data and the second or subsequent frame of video data; and
    assigning a direction of travel based on a gradient between the timestamps in which the assigned direction points from the earlier-in-time timestamp to the later-in-time timestamp.

10. The method of claim 9, further comprising:
    detecting a person approaching or exiting the elevator cab, wherein controlling the state of the elevator doors includes changing the state of the elevator doors from a door closing state to a door opening state based, at least in part, on the detection of the person approaching or exiting the elevator cab.

11. The method of claim 1, wherein controlling the elevator door operation includes controlling a state of the elevator doors and a speed associated with the elevator doors during opening and/or closing of the elevator doors, and wherein the speed of the elevator doors is controlled based, at least in part, on the determined distance between the elevator doors.

12. A system for controlling elevator door operation based on video data, the system comprising:
    at least one video detector configured to acquire and transmit video data in the form of a plurality of frames;
    a video recognition system operably connected to receive the video data from the at least one video detector, wherein the video recognition system is operable to:
        detect a position of doorframe edges of the elevator doors based on the acquired video data; and
        determine a distance between the doors based on a number of pixels located between the detected position of the doorframe edges of the elevator doors for each of the plurality of frames; and
    an elevator controller operably connected to receive the distance data determined by the video recognition system, wherein the elevator controller is configured to control the operation of the elevator doors based, at least in part, on the determined distance between the elevator doors.

13. The system of claim 12, wherein the video recognition system is configured to detect the position of the elevator doors by employing a line-based method, a mark-based method, or a combination thereof.

14. The system of claim 12, wherein the elevator controller is configured to control a speed associated with an opening and/or closing of the elevator doors based, at least in part, on the distance determined by the video recognition system.

15. The system of claim 12, wherein the elevator controller is configured to determine a current state associated with the elevator doors based on the distance determined in successive frames of the video data.

16. The system of claim 15, wherein the elevator controller is configured to control a length of time the elevator doors are maintained in an opened or closed state based on the determined state of the elevator doors.

17. The system of claim 12, wherein the video recognition system is operable to detect the presence of a person approaching or exiting an elevator cab.

18. The system of claim 17, wherein the video recognition system is further operable to detect a direction associated with the detected person based on successive frames of video data.

19. The system of claim 18, wherein the elevator controller is configured to control the operation of the elevator doors based, at least in part, on the detected presence of a person approaching or exiting the elevator cab.

20. A video recognition system comprising:
   means for receiving video data captured by a video detector, the video data comprised of a plurality of frames;
   means for detecting doorframe edges of elevator doors within a field of view of the video detector based on the video data;
   means for determining a distance between the elevator doors based on the detected doorframe edges; and
   means for generating an output based on the determined distance between the elevator doors;
   wherein the means for determining a distance between the elevator doors based on the detected doorframe edges includes a distance determining device that is configured to determine the distance between the detected doorframe edges based on a number of pixels located between the detected doorframe edges.

21. The video recognition system of claim 20, wherein the means for detecting the position of the elevator doors includes:
   an edge detector that is configured to detect edges within the received video data;
   a line detector that is configured to detect straight lines within the detected edges;
   a line selector that is configured to select one or more of the detected straight lines occurring within a range of allowable angles;
   a line merger that is configured to merge discontinuous portions of the selected straight lines; and
   a door edge detector that is configured to select from the merged, straight lines one or more lines representing the doorframe edges of the elevator doors.

* * * * *